United States Patent
Jeevanjee et al.

(10) Patent No.: US 7,415,467 B2
(45) Date of Patent: Aug. 19, 2008

(54) DATABASE REPLICATION SYSTEM

(75) Inventors: Zulfikar Jeevanjee, Webster Groves, MO (US); Kenneth L. Long, O'Fallon, MO (US)

(73) Assignee: Ixion, Inc., O'Fallon, MO (US)

( * ) Notice: Subject to any disclaimer, the term of this patent is extended or adjusted under 35 U.S.C. 154(b) by 371 days.

(21) Appl. No.: 10/885,844

(22) Filed: Jul. 7, 2004

(65) Prior Publication Data

US 2004/0249870 A1  Dec. 9, 2004

Related U.S. Application Data

(63) Continuation-in-part of application No. 10/795,701, filed on Mar. 8, 2004, now abandoned.

(60) Provisional application No. 60/452,627, filed on Mar. 6, 2003.

(51) Int. Cl.
*G06F 17/30* (2006.01)
*G06F 17/00* (2006.01)

(52) U.S. Cl. .......................................... 707/8; 707/10
(58) Field of Classification Search .................. 707/8, 707/10, 9, 204; 709/204
See application file for complete search history.

(56) References Cited

U.S. PATENT DOCUMENTS

| 4,714,996 | A | * | 12/1987 | Gladney et al. | 707/203 |
|---|---|---|---|---|---|
| 6,016,497 | A | * | 1/2000 | Suver | 707/103 R |
| 6,111,582 | A | * | 8/2000 | Jenkins | 345/421 |
| 6,122,630 | A | * | 9/2000 | Strickler et al. | 707/8 |
| 6,438,538 | B1 | * | 8/2002 | Goldring | 707/3 |

* cited by examiner

*Primary Examiner*—Charles Rones
*Assistant Examiner*—Fariborz Khoshnoodi
(74) *Attorney, Agent, or Firm*—Robert O. Enyard, Jr.; Polsinelli Shalton Flanigan Suelthaus PC (57) ABSTRACT

A system and method for database replication having that captures change operations made to an application database, aggregates the change operations performed upon the application database; and applies the aggregated change operations to a replica application database in a single operation.

20 Claims, 6 Drawing Sheets

DATABASE REPLICATION SYSTEM

RELATED APPLICATIONS

The present application is a continuation-in-part of U.S. patent application Ser. No. 10/795,701, filed Mar. 8, 2004, now abandoned which claims priority to U.S. Provisional Patent Application Ser. No. 60/452,627, filed Mar. 6, 2003. The contents of both applications are expressly incorporated herein by reference.

BACKGROUND OF THE INVENTION

A. Field of the Invention

The invention relates to the field of database replication. More specifically, the invention relates to a database replication system that utilizes array level processing to execute operations upon a replica database.

B. Description of Related Art

Data replication is the process of maintaining multiple copies of a database object in a distributed database system. Performance improvements can be achieved when data replication is employed, since multiple access locations exist for the access and modification of the replicated data. For example, if multiple copies of a data object are maintained, an application can access the logically "closest" copy of the data object to improve access times and minimize network traffic. In addition, data replication provides greater fault tolerance in the event of a server failure, since the multiple copies of the data object effectively become online backup copies if a failure occurs.

In general, there are two types of propagation methodologies for data replication, referred to as "synchronous" and "asynchronous" replication. Synchronous replication is the propagation of changes to all replicas of a data object within the same transaction as the original change to a copy of that data object. For example, if a change is made to a table at a first replication site by a Transaction A, that change must be replicated to the corresponding tables at all other replication sites before the completion and commitment of Transaction A. Thus, synchronous replication can be considered real-time data replication. In contrast, asynchronous replication can be considered "store-and-forward" data replication, in which changes made to a copy of a data object can be propagated to other replicas of that data object at a later time. The change to the replicas of the modified data object does not have to be performed within the same transaction as the original calling transaction.

Synchronous replication typically results in more overhead than asynchronous replication. More time is required to perform synchronous replication since a transaction cannot complete until all replication sites have finished performing the requested changes to the replicated data object. Moreover, a replication system that uses real-time propagation of replication data is highly dependent upon system and network availability, and mechanisms must be in place to ensure this availability. Thus, asynchronous replication is more generally favored for non-critical data replication activities.

However, the faster an asynchronous replication can store, forward and apply the change to the replica database the more that an asynchronous replication system benefits from the advantages of a synchronous replication system without the associated overhead.

Therefore, there is a need for asynchronous database replication systems that more efficiently use system resources in order to minimize time lag between the moment a change is applied to primary database and the moment a change is applied to a replica database.

SUMMARY OF THE INVENTION

A system and method for database replication having that captures change operations made to an application database, aggregates the change operations performed upon the application database; and applies the aggregated change operations to a replica application database in a single operation.

DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention is a data replication system for a database. Generally, a data replication system allows real-time replication of data within a primary database to a replica database. Because operations are constantly being performed upon a database by users, maintaining real-time replication of the database requires that the identical operations be performed upon the replica database. Users may manipulate the database by performing operations, for example, insert, update and delete. The insert operation incorporates a new row of information within the database. The update operation modifies a row of information already within the database. The delete operation removes a row of information within the database.

The replica database is often located remotely from the primary database. Therefore, it is advantageous to create performance enhancements to better utilize communication bandwidth between the primary database and the replica database. Additionally, because it is not being directly queried by users to discover, add, change and delete its contents, it is advantageous to improve system performance by more efficiently using system resources in performing operations that modify the replica database.

By maintaining a replica database, users may utilize the replica database when the primary database is unavailable for maintenance, corrupted or has been destroyed with little or no user downtime. Therefore, moving data to a remote replica database for switchover of primary processing can eliminate scheduled downtime and is critical when an unexpected event compromises the primary database. The present invention replicates data extremely quickly, allowing it to keep the replica database in synchronization with the primary database during periods of high database activity and provides an extremely low probability of data loss during the event of an unplanned failure of the primary database.

The present invention is enabled to perform optimally by including a trigger-based approach to replication, a pull architecture that minimizes overhead on the primary system, a minimized reliance on shared memory to reduce the chance of data loss, the use of data compression to allow high levels of replication performance on low-bandwidth networks, and a high-performance apply engine. However, the present invention can also be used in a log-based, application-based (API), hook-based or network packet-based environment.

The triggers are "after" operation triggers, meaning that after an operation has been performed in the primary database the trigger is executed to prompt the steps to forward and excite the identical operation on the replica database. The triggers fire on insert, update and delete operations. Triggers capture the table name, operation (insert, update or delete), commit scn number, the application data values and the operation sequence number (for execution ordering). Preferably, no column information is captured or transmitted. The triggers insert the application data into a primary database capture table The replication process is generally composed of five primary steps:

1. Database triggers record the user action into a database capture table,
2. Data recorded in the capture table is compressed and the uncompressed data is deleted,
3. The mirrored site(s) fetches the compressed data,
4. The data is uncompressed,
5. The data is applied to the replica database.

Figure 1:
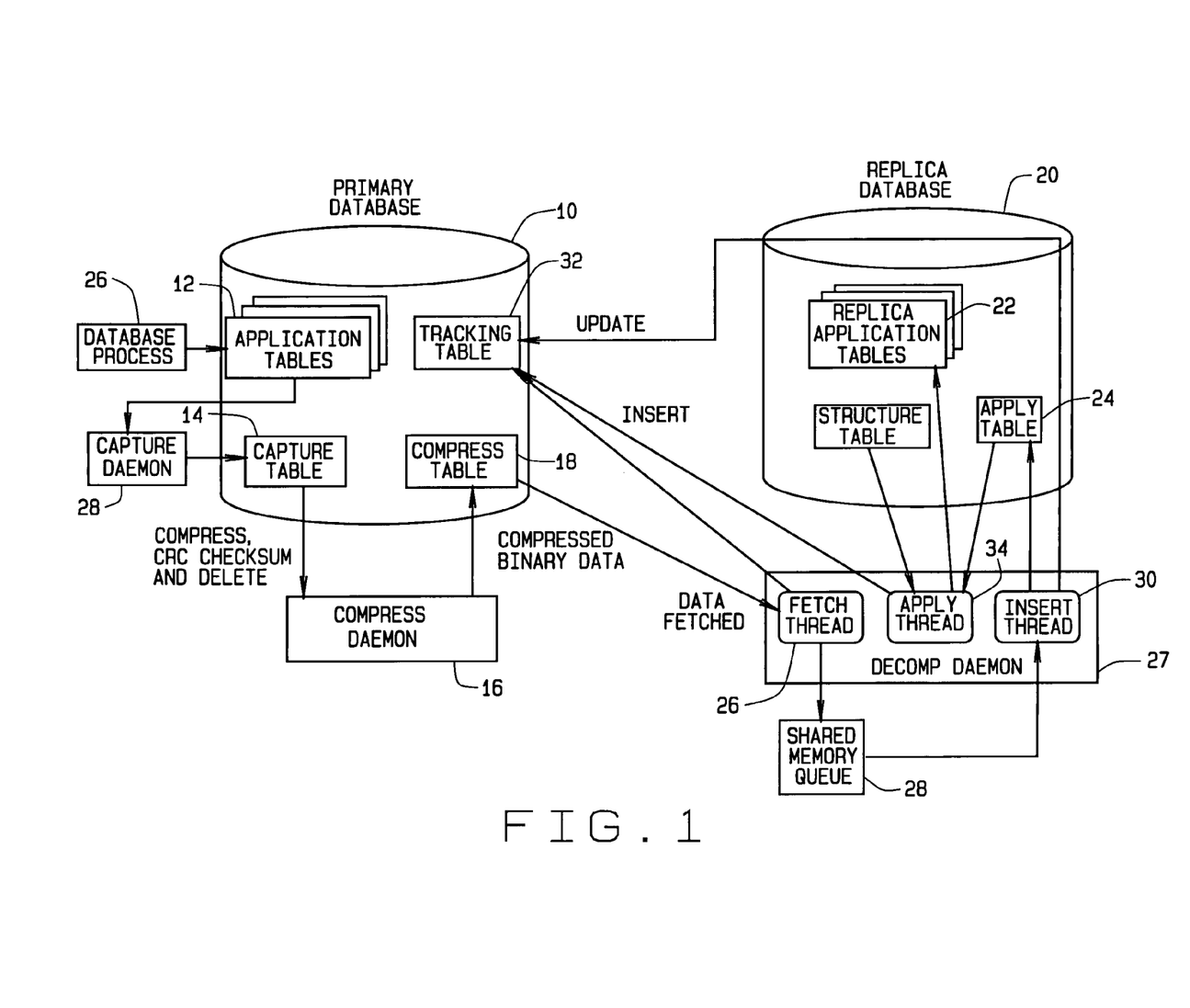
FIG. 1 is a diagram of an embodiment of the present invention.

Referring to FIG. 1, a primary database 10 exists having an application table 12 containing information that the user desires to be replicated. Also provided is a capture table 14. The capture table 14 contains a copy of all insert, update and delete operations performed on the primary database 10. A compress daemon 16 compresses the operations and stores the compressed information in a compress table 18 within the database 10. The compress daemon 16 also removes the stored operations in the capture table 14 after it has compressed them and inserted them into the compress table 18.

A replica database 20 comprises replica application tables 22, an apply table 24, and a structure table 25. The replica application tables 22 are an asynchronous backup of the application tables 12, and the apply table 24 contains aggregated change operations to be applied to the replica application table 22. The structure table 25 contains information about the structure of the application tables 12, and thus the replica application tables 22, such as foreign key relationships of the tables 12.

Figure 2A:
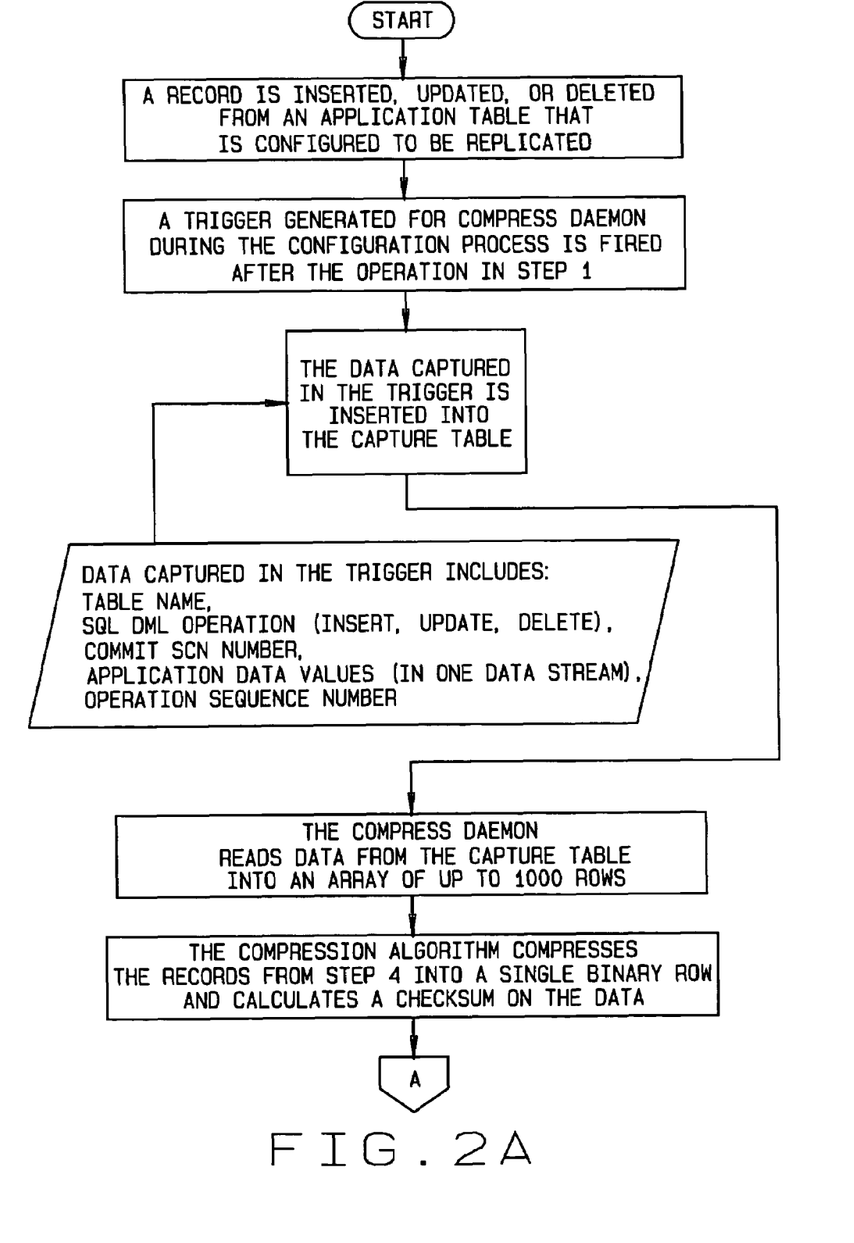
FIGS. 2A-2C are a flow chart of the replication process flow according to an embodiment of the present invention.

Referring to FIG. 2A, the replication process flow starts with a record being inserted, updated or deleted from the application table 12 by a database process 26 that utilizes the primary database 10. After performing one of the insert, update or delete operations, the database process 26 fires the trigger.

The trigger causes the storage the table name, operation, commit scn number, the application data values and the operation sequence number in the capture table 14.

A compress daemon 16 polls capture table on a periodic basis and assembles an array of up to 1000 rows of data, each row corresponding to a operation performed upon the application table 12. The compress daemon 16 then compresses the assembled records into a single binary row and calculates a checksum on the data.

Figure 2B:
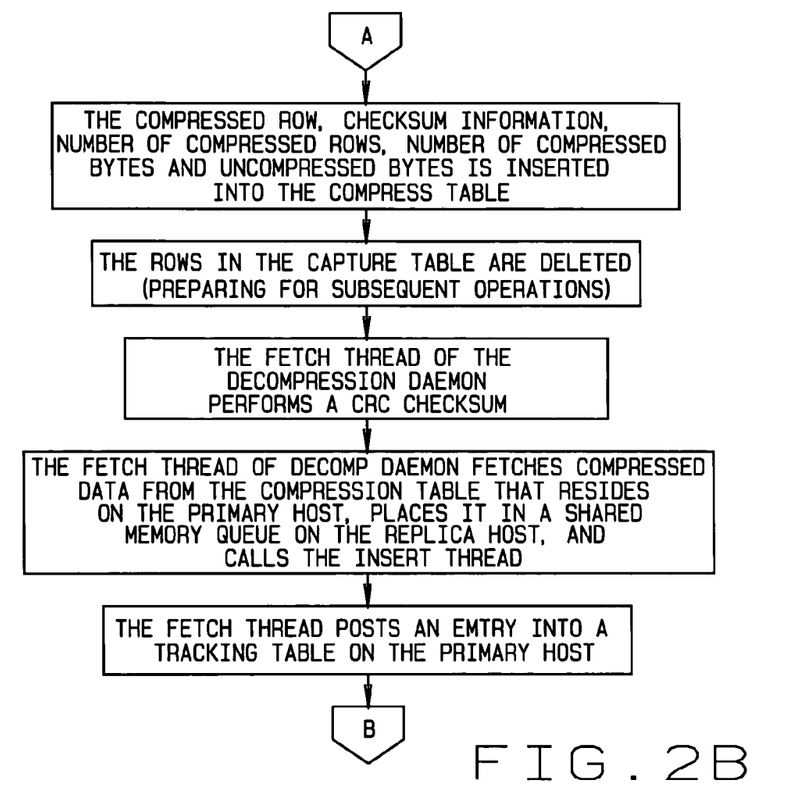

Referring to FIG. 2B, the compressed row, checksum, number of rows with the compressed row, and number of bytes within the compressed row before and after compression is stored within the compress table 18. The compress daemon 16 next deletes the rows from the capture table 14 that were compressed into the compress table 18.

The fetch thread 26 of the decomp daemon 27 associated with the replica database 20 retrieves the compressed row of data within the compress table 18 of the primary database 10 over a network connection. The fetch daemon 26 next performs a CRC checksum to ensure that the data has not been corrupted during transmission. If the data CRC checksum does not match the daemon logs the error and shuts down. The user is then able to perform diagnostics to determine the cause of the error.

The fetch thread 26 next places the compressed row retrieved from the compress table 18 in a shared memory queue 28 and calls the insert thread 30. The fetch thread 26 then posts an entry into the tracking table 32 of the primary database 10. The tracking table contains the instance id, the compressed log id and the state of the transmission of the log id. It is either null indicating that it has been fetched but not yet posted to the replica apply_log table. The state is later updated to processed when the entry is written to the replica apply_log table. Thus at this point it can later be cleaned out by the cleanup thread of the compress daemon. Once an entry exists in the table the fetch thread will not refetch that data. This is done by using the data in the table as part of the subquery in the where clause of the fetch select statement.

Figure 2C:
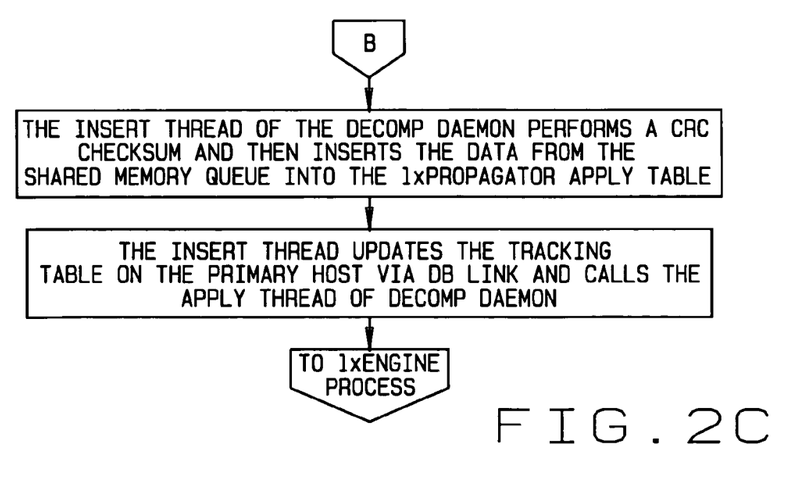

Referring to FIG. 2C, upon being called by the fetch thread 26, the insert thread 30 retrieves the compressed row of information from the shared memory queue 28 and inserts it into the apply table 24 of the replica database 20. Via a network connection, the insert thread 30 next updates the tracking table 32 of the primary database 10 to indicate that the compressed row was successfully applied to the apply table 24. The insert thread next calls the apply thread 34.

Figure 3:
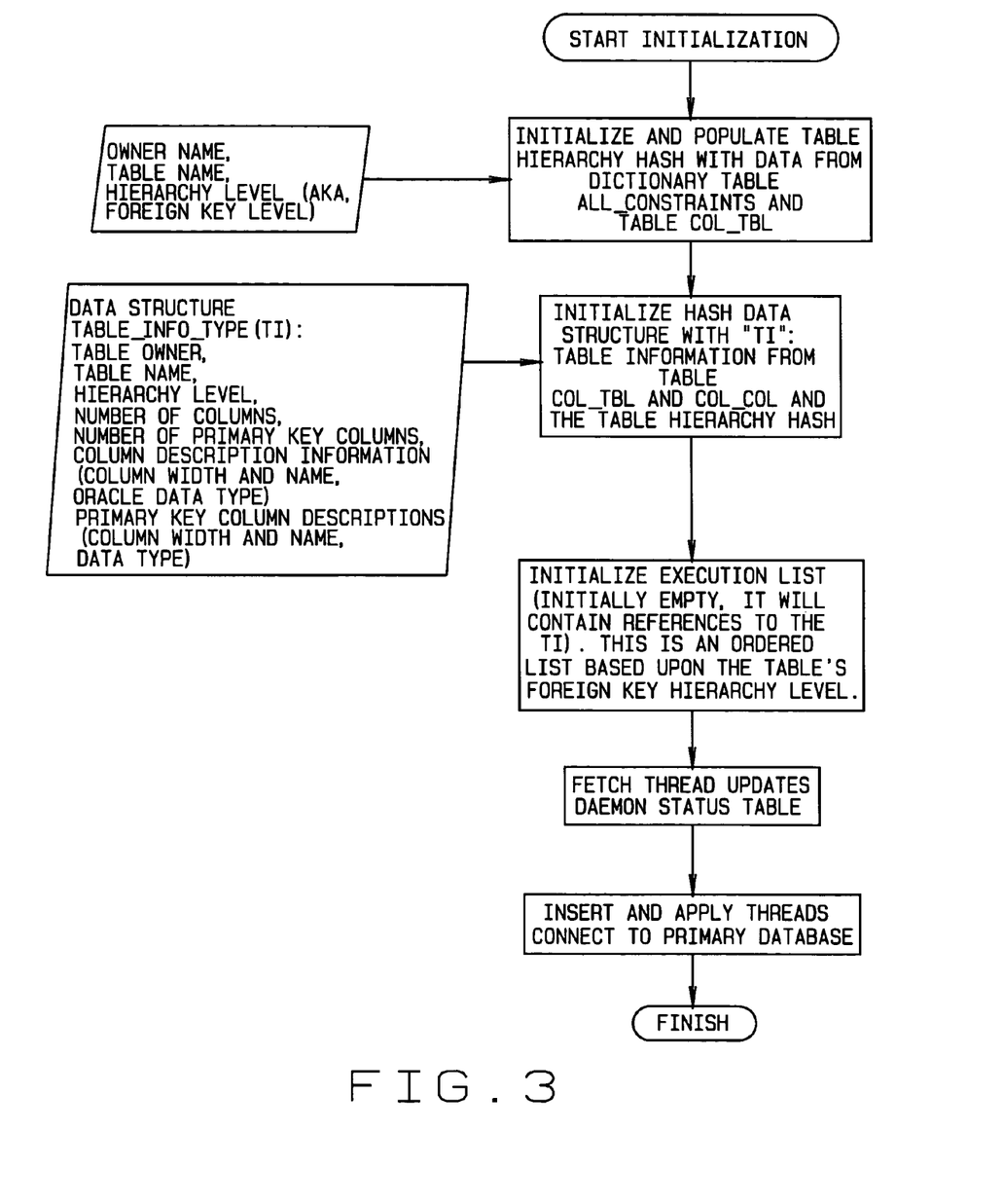
FIG. 3 is a decomp daemon initialization process flow chart according to an embodiment of the present invention.

Turning to FIG. 3, when the decomp daemon 27 is initialized, the decomp daemon 27 operates by first initializing and populating a table hierarchy hash based upon owner name, table name and hierarchy level of each table that the present invention is replicating. This information is obtained from the primary database via the network connection.

The hash data structure is then initialized with table information of each table's owner, name, hierarchy level, number of columns, number of primary key columns, each column's description information (column width, name and data type), and each primary key column's description information (column width, name and data type).

Next, an execution list is generated comprising an ordered list based upon each table's foreign key hierarchy level.

Figure 4A:
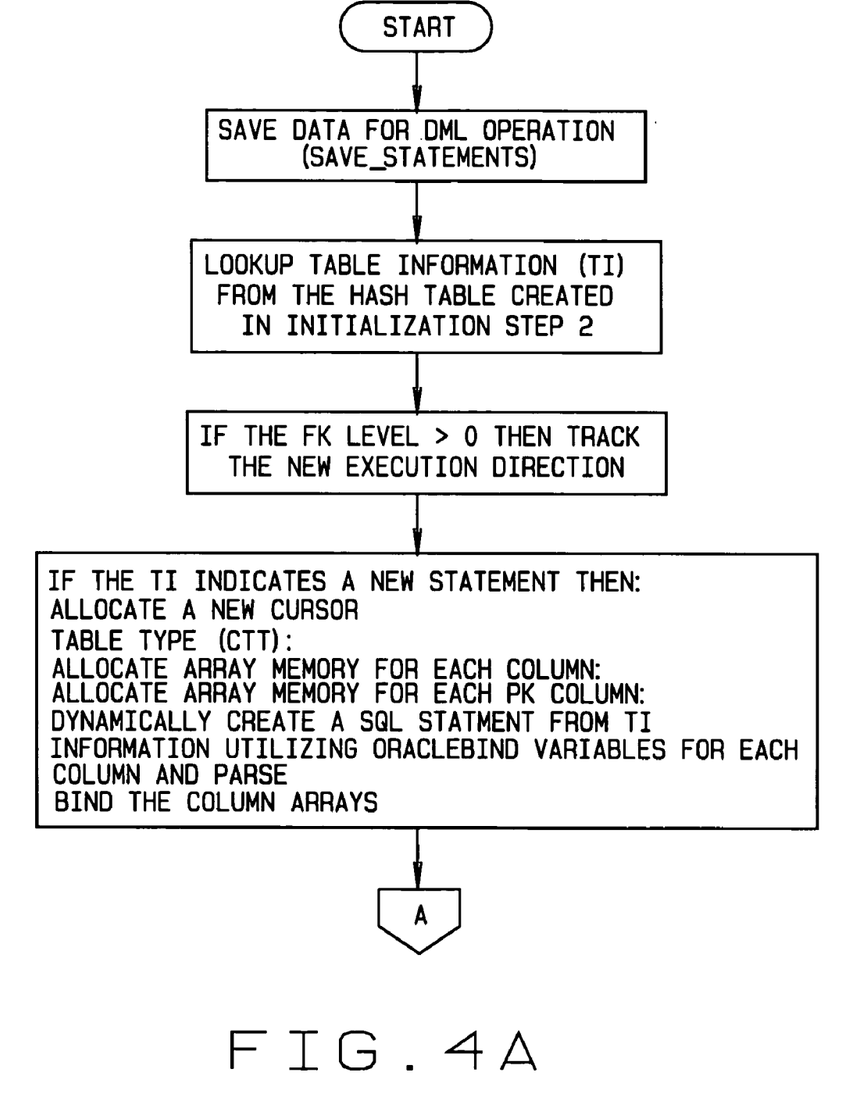
FIGS. 4A-4B are decomp daemon save process flow chart according to an embodiment of the present invention.
Figure 4B:
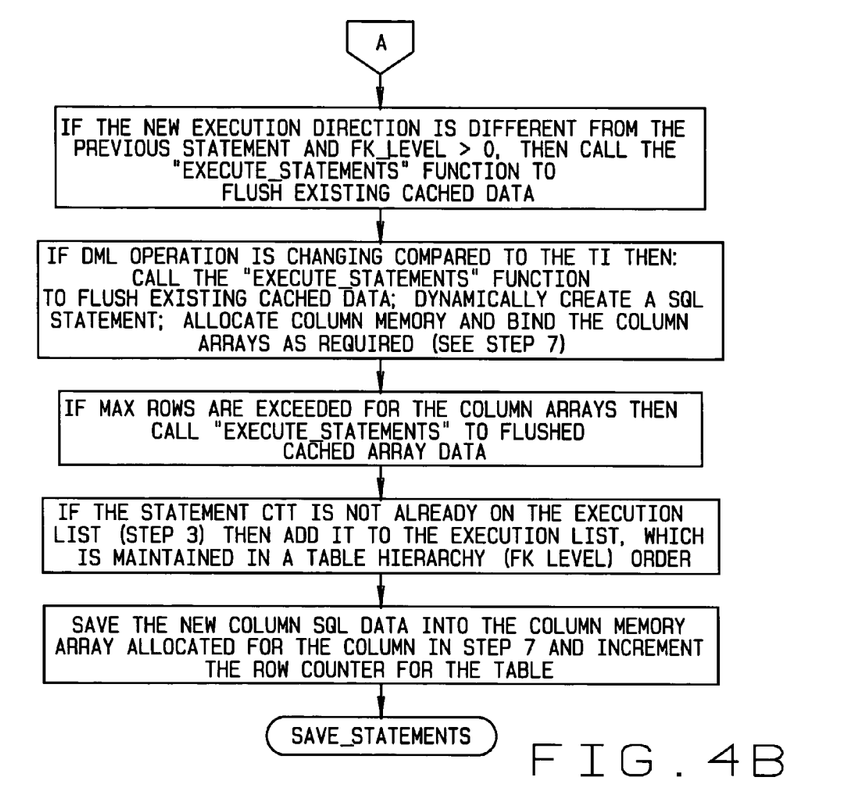

FIGS. 4A-4B show the process for a save statements function of the apply thread 34. The apply thread 34 monitors the apply table 24 and applies any updates within the apply table 24 to the replica application table 22. First, the compressed binary row is read from the apply table 24 and the first operation within the compressed row examined. Next, the table information for the application table 12 upon which the operation is operating is retrieved from the hash data structure. Based upon the table information retrieved, if the foreign key level of the table upon which the operation is executing is greater than zero, then the direction of execution is tracked.

Insert and update operations are forward executing operations in that the parent tables are operated upon before child tables. The delete operation is a reverse executing operation in that child tables are operated upon before parent tables.

Next, if the table information indicates a new ctt operation, the apply thread 34, looks up the table information structure from the hash created during initialization, allocates a new ctt, allocates array memory for each column, creates a SQL statement, parses the statement, and binds the column memory locations.

Figure 5:
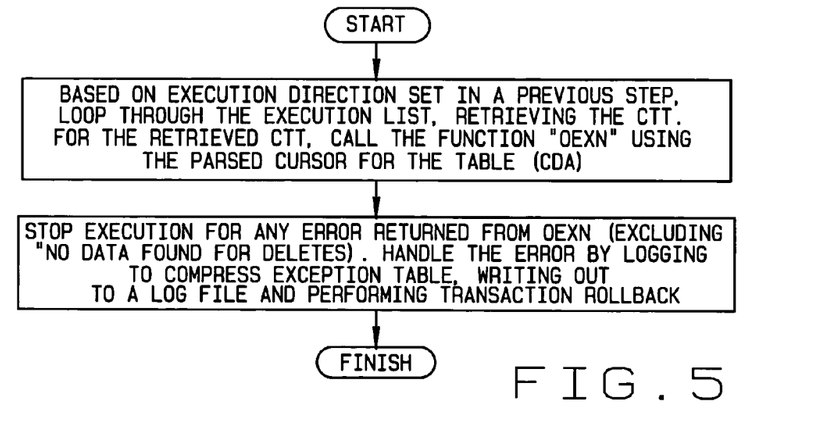
FIG. 5 is a decomp daemon execution process flow chart according to an embodiment of the present invention.

If the new execution direction is different from a previous execution direction and the foreign key level is greater than zero, the apply thread 34 calls the "execute statements" function (FIG. 5). Next, if the operation is changing compared to the table information, call the execute statements function, reinitialize the statement ctt, this dynamically creates a bound SQL statement and parses.

Next, if the maximum rows would be exceeded for the memory storage array then call the execute statements function. If the statement ctt is not already on the execution list, then add it to the list. This is maintained in a table hierarchy (foreign key level) order.

Finally, the apply thread 34 saves the new SQL data into the memory locations previously allocated and increments the row counter for the table.

The end result of the algorithm is that it groups rows of data for each table, and saves them to the database in table hierarchy order.

FIG. 5 shows the process for an execute statements function of the apply thread 34. First, based upon the execution direction, loop through the execution list, retrieve the CTT, and for each CTT using the parsed cursor for the table. Next, stop execution for any error returned during array processing of multiple rows of data with single call (for example, the oexn function within ORACLE database environments) except an error of "no data found" for a delete operation. Errors may be handled by logging the error to a compress exception table, writing out to a log file and performing a transaction rollback.

Further extensions of the present invention may be made to the algorithm to gain even greater gains in performance. Because tables having a foreign key relationship level of zero are totally independent of each other, as are the tables within the sub-tree of each table having a foreign key relationship level of 1, the algorithm may be modified to track and group the level 1 objects and their associated children tables. Then an independent database connection and thread of execution could be created for each level 1 table. Thus, execution could be processed in parallel. Level 0 tables could be either evenly and randomly distributed amongst the parallel execution threads for the level 1 tables, or they could be grouped separately into their own groups or subsets of groups of execution threads. The degree of parallelization to be achieved could be very high, relative to the number of available CPU's within the system. Thus a limit based upon the CPU's should be considered or at least a multiple thereof.

Moreover, while the present invention is described in terms of buffering operations until a change in execution direction is detected, at which time the buffered operations are executed on the replica database, the present invention may be implement by buffering operations based upon other factors. For example, the present invention could buffer operations based merely upon operation type or table affected by the operation, any change in which could cause the buffered operations be executed upon the replica database.

In view of the above, it will be seen that several advantages of the present invention have been achieved and other advantageous results have been obtained.

We claim:

1. A method for replicating a change operation performed upon an application database to a replica application database, comprising:

capturing change operations made to one or more application tables stored in an application database;

aggregating the captured change operations performed upon the one or more application tables in a memory;

monitoring the aggregated change operations to identify a triggering event corresponding to a change operation having a different execution direction; and applying the aggregated change operations having a same execution direction to one or more replica application tables in the replica application database that correspond to the one or more application tables in the application database in a single operation in response to the identified triggering event, wherein a sequence in which each of the aggregated change operations are applied to the one or more replica tables during the single operation is based on a hierarchy level of the corresponding one or more application tables;

wherein the triggering event is the first occurrence of either of a change in execution direction of the change operation or a predetermined number of aggregated change operations being reached in the memory for an individual replica table;

wherein aggregating the change operations performed upon the application database includes aggregating the change operations to be applied to the replica database in a first sequence corresponding to the order in which the change operations where performed upon the application database, and wherein applying the aggregated change operations includes applying the aggregated change operations in a second sequence corresponding to the hierarchy level of the corresponding one or more application tables.

2. The method of claim 1 wherein identifying the triggering event includes identifying a triggering event that corresponds to the occurrence of a change in a table of the database upon which the operation is acting.

3. The method of claim 2 wherein identifying the triggering event includes identifying a triggering event that corresponds to the occurrence of a predetermined number of aggregated change operations being reached in memory for an individual replica table.

4. The method of claim 1 further comprising transmitting the change operations performed upon the application database from a primary location to a replica location.

5. The method of claim 4 wherein a computer at the replica location initiates the retrieval of the change operation information from the primary location.

6. The method of claim 4 further comprising compressing the change operation information before it is transmitted.

7. The method of claim 6 wherein the change information is compressed by a computer located at the primary location.

8. The method of claim 1 further comprising tracking change operations that have been applied to the replica database.

9. The method of claim 1 further comprising tracking change operations that have been retrieved from a primary location to a secondary location.

10. The method of claim 1 further comprising:

logically dividing application tables into groups of application tables having no interrelationship with any other group; and wherein aggregating the change operations performed upon the application database and applying the aggregated change operations to a replica application database in a single operation are performed independently for each of the groups such that aggregation and application can be performed in parallel for each group.

11. The method of claim 10 wherein logically dividing the application tables into groups is performed by logically dividing each application table having a foreign key level of one and the application table's associated children tables, said foreign key level of one indicating a table with no parent tables and at least one child table.

12. The method of claim 10 wherein logically dividing the application tables into groups is performed by randomly logically dividing application tables having a foreign key level of zero into groups of a predetermined size.

13. A system for replicating change operations performed upon a primary database to a replica database, said system comprising:
   a plurality of application tables stored on the primary database;
   a capturing component associated with the primary database for recording change operation data for each change operation performed upon one or more of the plurality of application tables;
   a plurality of replica tables stored on the replica database, wherein the plurality of replica tables corresponds to the plurality of application tables stored on the primary database;
   an aggregation component operatively associated with the replica database for aggregating change operation data in an apply table linked to the replica database; and
   an apply component operatively associated with the replica database for monitoring the aggregating change operations in the apply table to identify a triggering event that indicates a change operation having a different execution direction and for applying change operations to the corresponding one or more replica application tables in the replica database in a single operation in response to the identified triggering event, wherein a sequence in which each of the change operations are applied to the corresponding one or more replica application tables during the single operation is based on a hierarchy level of the corresponding one or more application tables;
   wherein the triggering event is the first occurrence of either of a change in execution direction of the change operation or a predetermined number of aggregated change operations being reached in an individual replica table.

14. The system of claim 13 wherein the capturing component comprises:
   a capture table for storing change operations performed on the primary database; and
   a compress daemon for compressing the change operations storage as the compressed operation data in a compressed table link to the primary database.

15. The system of claim 13 wherein the aggregation component comprises:
   a fetch thread for fetching recorded change operation data for storage in a shared memory;
   an insert thread operatively associated with the replica database for retrieving change operation data from the shared memory and inserting the retrieved change operation data into the apply table.

16. The system of claim 13 wherein the apply component is responsive to the insert thread to retrieve change operation data from the apply table for application to the replica application tables.

17. The system of claim 13 wherein the aggregation component aggregates change operations in a first sequence that corresponds to the order in which the change operations where performed upon the application database, and wherein the apply component applies the aggregated change operations to the replica application tables in a second sequence that correspond to the hierarchy level of the corresponding one or more application tables.

18. The system of claim 13 wherein the plurality of application tables are logically divided into groups of application tables having no interrelationship with one another and wherein the aggregation component aggregates the change operations performed upon the one or more of the plurality of application tables and applies the aggregated change operations to corresponding one or more of the plurality of replica tables in a single operation that is performed independently for each of the groups such that aggregation and application can be performed in parallel for each group.

19. The method of claim 1, wherein the hierarchy level is retrieved from a hash data structure operatively linked to the replica application database.

20. The method of claim 19, wherein the hash data structure is populated during an initialization process of the replica application database.

* * * * *